(12) United States Patent
Hsieh

(10) Patent No.: US 9,199,263 B2
(45) Date of Patent: Dec. 1, 2015

(54) MIST PRODUCING DEVICE FOR PLAYGROUND WITH SUN SHADE APPARATUS

(71) Applicant: Paul Hsieh, City of Industry, CA (US)

(72) Inventor: Paul Hsieh, City of Industry, CA (US)

( * ) Notice: Subject to any disclaimer, the term of this patent is extended or adjusted under 35 U.S.C. 154(b) by 0 days.

(21) Appl. No.: 14/264,026

(22) Filed: Apr. 28, 2014

(65) Prior Publication Data

US 2014/0231547 A1 Aug. 21, 2014

Related U.S. Application Data

(63) Continuation of application No. 13/385,554, filed on Feb. 24, 2012, now Pat. No. 8,753,216.

(51) Int. Cl.
| | |
|---|---|
| *A63G 21/18* | (2006.01) |
| *B05B 15/06* | (2006.01) |
| *A63G 31/00* | (2006.01) |
| *B05B 1/20* | (2006.01) |
| *F24F 5/00* | (2006.01) |
| *A47D 13/00* | (2006.01) |

(52) U.S. Cl.
CPC ............ *B05B 15/061* (2013.01); *A63G 31/007* (2013.01); *B05B 1/205* (2013.01); *F24F 5/0035* (2013.01); *Y02B 30/545* (2013.01)

(58) Field of Classification Search
CPC ............. A63G 3/00; A63G 3/02; A63G 9/00; A63G 21/10; A63G 21/18; A63G 31/00; A63G 31/007; A47D 13/105; A47D 13/107; A63H 23/10; A61K 8/02; A61K 8/35
USPC .................... 472/13, 117, 128; 239/279, 289; 446/153
See application file for complete search history.

(56) References Cited

U.S. PATENT DOCUMENTS

| | | | | |
|---|---|---|---|---|
| 3,246,892 | A * | 4/1966 | Grudoski | 472/117 |
| 4,548,357 | A * | 10/1985 | Schmidt | 239/289 |
| 6,786,830 | B2 * | 9/2004 | Briggs et al. | 472/128 |
| 7,641,594 | B2 * | 1/2010 | Hickey | 482/29 |

* cited by examiner

*Primary Examiner* — Kien Nguyen
(74) *Attorney, Agent, or Firm* — Raymond Y. Chan; David and Raymond Patent Firm

(57) ABSTRACT

A play set with a mist device includes a mist frame unit supported through a framework of the play set. The mist frame unit has a hollow body and a flexible hose member mounted onto the framework, wherein a portion of the flexible hose member is constructed into a hose ring encircling a slide unit; a water inlet provided at a first end of the mist frame unit for connecting to a water source; and a plurality of mist producing units provided along the mist frame unit arranged for producing mist such that a preset mist surrounding area is defined within which the play set is located, therefore the mist can reach all play units of the play set, including the slide unit through the hose ring at an angle which is greater than 270°, thereby providing a cooling effect to the mist surrounding area.

17 Claims, 7 Drawing Sheets

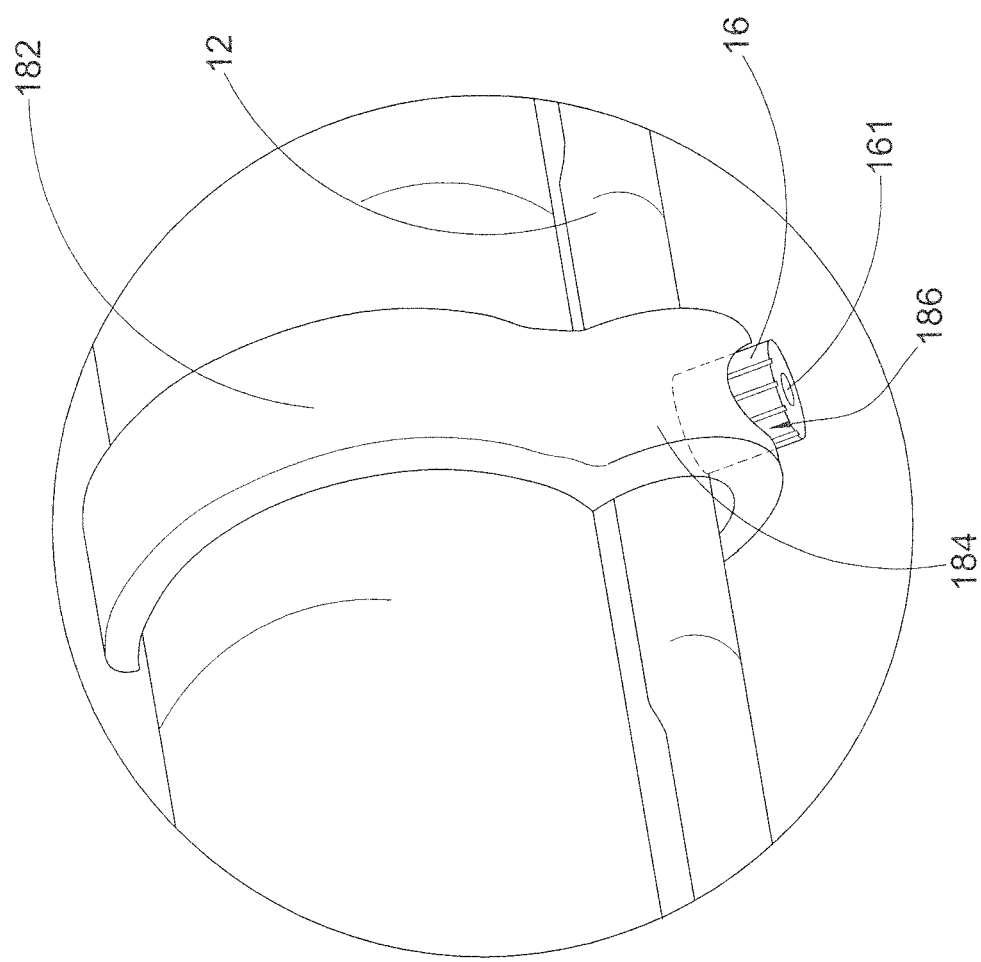

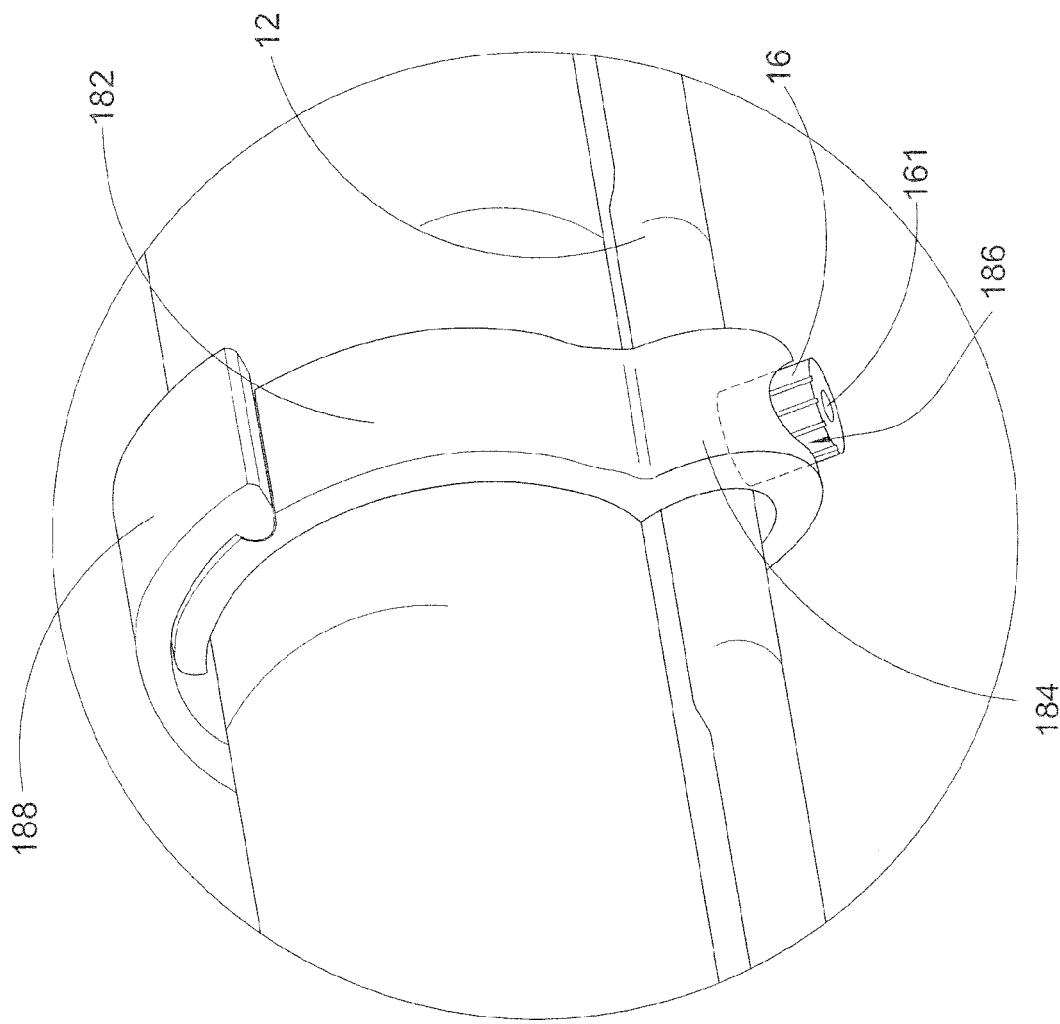

MIST PRODUCING DEVICE FOR PLAYGROUND WITH SUN SHADE APPARATUS

CROSS REFERENCE OF RELATED APPLICATION

This is a Continuation application that claims the benefit of priority under 35 U.S.C. §119 to a non-provisional application, application Ser. No. 13/385,554, filed Feb. 24, 2012.

BACKGROUND OF THE PRESENT INVENTION

1. Field of Invention

The present invention relates to a mist device for playground, and more particularly to a mist producing device for playground with sunshade apparatus which is capable of spraying mist around a play set of the playground area.

2. Description of Related Arts

A play set is usually located outdoor for providing a play area to kids. For example, a play set may include a swing, a slide and some climbing area. During summer time, the temperature is high and the sunlight is strong. Therefore it is not really enjoyable to play under high temperature and strong sunlight conditions. In addition, it is not really safe to play outdoor under the sun when the temperature is high and the sunlight is strong. Accordingly, there is a need to solve the problem of high temperature and strong sunlight for the play area.

A play set is common in backyard or front yard. The play set may include different play units and have very different construction. Additional structure to protect kids against high temperature and sunlight has to be flexible enough for fitting into different play set construction so as to fit the particular need of a user. In addition, some play units, such as a slide unit of a play set, does not provide any side or top supporting structure. Accordingly, it is difficult to have any accessories from the top or from the side.

A sunshade may be provided to the shade the play set. However, if the sunshade is a separate structure, it is not possible to fit perfectly for the play set, which is usually not having a very round or rectangular setting. As the play set may utilize an area of L-shaped or irregular shape, conventional sunshade, which is usually rectangular or round in shape, will not be able to fit the play set for use.

SUMMARY OF THE PRESENT INVENTION

The invention is advantageous in that it provides a mist producing device to a play set such that mist is provided to cover the playground area in which the play set is located.

Another advantage of the invention is to provide a mist producing device to a play set which is capable of providing mist to the play set at different angles or directions.

Another advantage of the invention is to a mist producing device which can be added to any existing play sets for providing mist to cover the playground area in which the play set is located.

Another advantage of the invention is to provide a mist producing device which includes a flexible hose member constructed into a hose ring such that a slide unit of the play set can be surrounded by the hose ring at 360° and having mist provided to the slide unit at all directions.

Another advantage of the invention is to provide a play set with a mist producing device and a sunshade unit so that the outdoor environment at which the play set is located is cooled and shaded.

Another advantage of the invention is to provide a play set with a mist producing device and a sunshade unit so that kids are protected against direct sunlight and high temperature and therefore can play safely in the outdoor environment at which the play set is located.

Additional advantages and features of the invention will become apparent from the description which follows, and may be realized by means of the instrumentalities and combinations particular point out in the appended claims.

According to the present invention, the foregoing and other objects and advantages are attained by a mist device for a play set having at least one play unit in a playground area, comprising:

a mist frame unit supported through a framework of the play unit, wherein the mist frame unit has a hollow and elongated body allowing water passage;

a water inlet provided at a first end of the mist frame unit arranged for connecting to a water source;

a plurality of mist producing units provided along the mist frame unit arranged for producing mist over the playground area such that a preset mist surrounding area is defined within which the play set is located, thereby providing a cooling effect to the mist surrounding area for the play set in the playground area.

In accordance with another aspect of the invention, the present invention comprises a play set with a mist device, wherein the play set includes at least a slide unit and a swing unit, comprising:

a mist frame unit supported through a framework of the play set, wherein the mist frame unit has a hollow body allowing water passage and comprises a flexible hose member mounted onto the framework of the play set, wherein a portion of the flexible hose member is constructed into a hose ring encircling the slide unit in such a manner that the slide unit is surrounded by the hose ring;

a water inlet provided at a first end of the mist frame unit arranged for connecting to a water source; and a plurality of mist producing units provided along the mist frame unit arranged for producing mist such that a preset mist surrounding area is defined within which the play set is located, therefore the mist can reach both the slide unit through the hose ring at an angle which is greater than 270° and the swing unit, thereby providing a cooling effect to the mist surrounding area.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIGS. 5A and 5B are illustrations of a connector unit according to the above preferred embodiment of the present invention.

DETAILED DESCRIPTION OF THE PREFERRED EMBODIMENT

Figure 1:
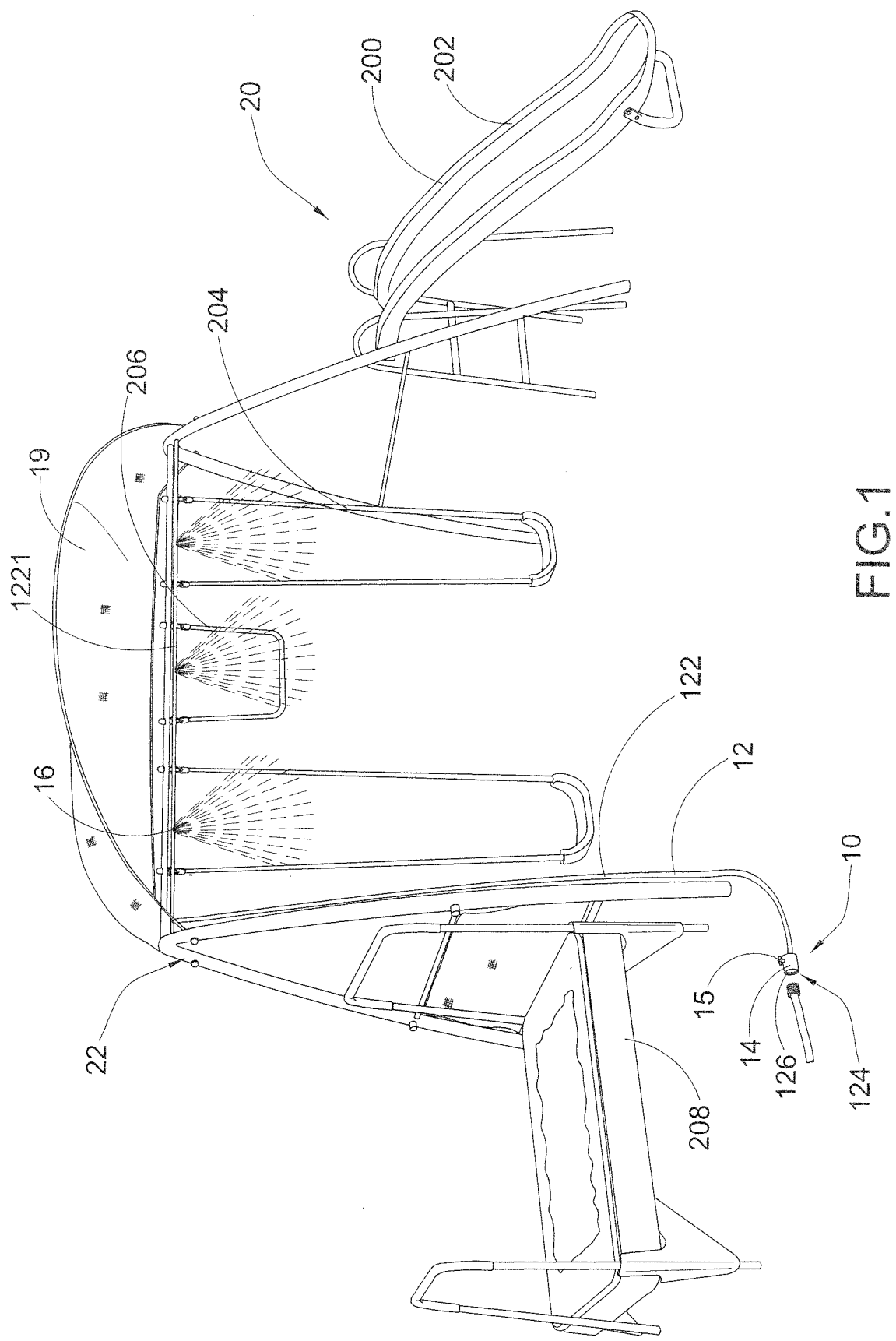
FIG. 1 is an illustration of a play set with mist producing device and sunshade unit according to a preferred embodiment of the present invention.

Referring to FIGS. 1 to 6 of the drawings, a mist producing device according to a preferred embodiment of the present invention is illustrated. The mist producing device 10 is arranged for providing mist to a play set 20 which includes at least one play unit 200 in a playground area and is supported through a framework 22 of the play set 20 for the play units 200.

For example, as shown in FIG. 1 of the drawings, the play set 20 includes one slide unit 202, two swing units 204, one swing bar unit 206 and one trampoline unit 208 and the mist producing device 10 is provided on the framework 22 of the play set 20 for providing mist to the different play units 200.

The mist producing device 10 comprises a mist frame unit 12 having an elongated and hollow body 122 opened at a first end 124 and defining a water channel 126 which allows water passage; a water inlet 14 provided at the first end 124 arranged for connecting to a water source such that water is flowing to the water channel 126 of the mist frame unit 12 from the water inlet 14 through the first end 124; and a plurality of mist producing units 16 on the body 122 of the mist frame unit 12 such that water flowing to the water channel 126 is sprayed outside the water channel 126 through the mist producing units 16 and a preset mist surrounding area is defined through the mist producing units 16 within which the play set 20 is located and a cooling effect is provided through the mist produced by the mist producing units 16. Preferably, a water control 15 is further provided at the water inlet 14 arranged turning on and off the water inlet 14 through opening and closing the water inlet 14 respectively for controlling a water flow to the water channel 126. Preferably, the mist producing unit 16 is a nozzle provided on mist producing device 10.

Preferably, the elongated and hollow body 122 of the mist frame unit 12 is a rigid frame member 1221 which is mounted onto the framework 22 of the play set 20. Therefore, the mist frame unit 12 is integrally formed onto the framework 22 of the play set 20.

Preferably, the elongated and hollow body 122 of the mist frame unit 12 is a flexible hose member 1222 detachably mounted onto the framework 22 of the play set 20. Therefore, the mist frame unit 12 is capable of being detachable from the framework 22 of the play set 20 for repositioning or replacement.

For example, as shown in FIG. 1 of the drawings, the elongated and hollow body 122 of the mist frame unit 12 comprises both the rigid frame member 1221 and the flexible hose member 1222 so as to fit into different parts of the framework 22 of the play set 20.

Figure 2:
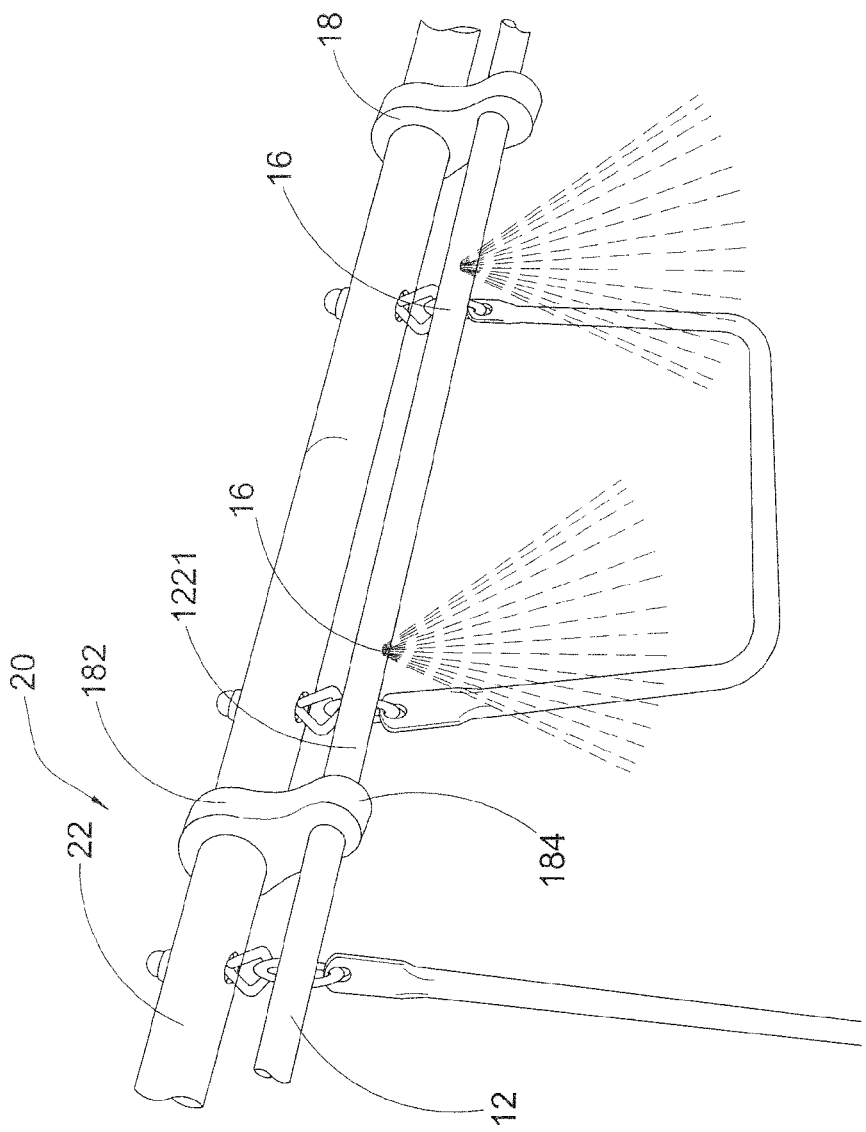
FIG. 2 is an illustration of a mist frame unit according to the above preferred embodiment of the present invention.
Figure 4:
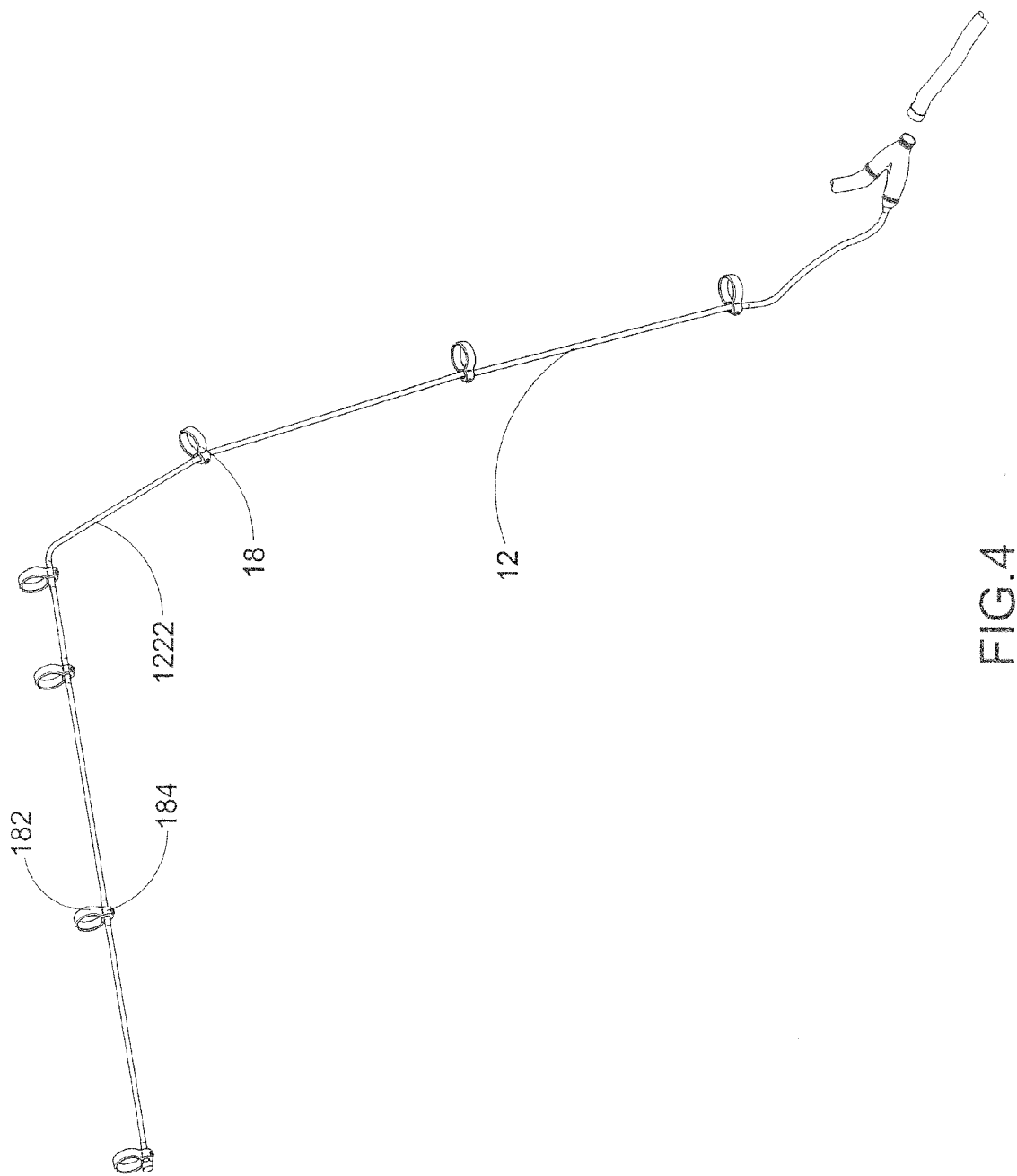
FIG. 4 is an illustration of a universal detachable mist frame unit according to the above preferred embodiment of the present invention.

Referring to FIGS. 2, 4 and 5 of the drawings, preferably, a plurality of connector units 18 are provided for mounting the elongated and hollow body 122 of the mist frame unit 12 onto the framework 22 of the play set 20. The connector unit 18 comprises a frame connecting member 182 connecting to the framework 22 and a mist connecting member 184 connecting to the mist frame unit 12.

Referring to FIG. 2 of the drawings, the connector units 18 has a double-ring structure in which a first ring structure defines the frame connecting member 182 through which a tube-like structure of the framework 22 of the play set 20 is penetrated such that the frame connecting member 182 is secured into position and a second ring structure defines the mist connecting member 184 through which the elongated and hollow body 122 of the mist frame unit 12 is penetrated such that the mist frame unit 12 is secured into position relative to the framework 22 of the play set 20. Accordingly, the rigid frame member 1221 of the mist frame unit 12 is securely mounted onto the framework 22 of the play set 20.

Referring to FIGS. 4 and 5 of the drawings, the mist connecting member 184 of the connector units 18 is a hose receiving member at a center of the connector unit 18 arranged for receiving the flexible hose member 1222 and the frame connecting member 182 of the connector member 18 is a framework biasing member extended from the hose receiving member at the center outwardly to two sides defining two end portions of the framework biasing member such that the framework biasing member is capable of biasing against a rod-like body of the framework 22 of the play set 20 to anchor and secure the flexible hose member 1222 in the hose receiving member onto the framework 22 through a biasing effect provided by the two sides of the framework biasing member and a clipping effect provided by the two end portions of the framework biasing member.

Accordingly, though the provision of the mist connecting members 184, the mist frame unit 12 which consists of the flexible hose member 1221 only is universal and applicable to any play set through the connector units 18. In other words, the mist producing device 10 can be detachably mounted onto any play set 20 as desired and addition of the mist producing device 10 to any existing play set is made possible.

Preferably, as shown in FIGS. 5A and 5B of the drawings, the connector unit 18 further comprise a connector opening 186 provided in the hose receiving member 184 which is sized to fit one mist producing unit 16, thereby the flexible hose member 1222 is supported through the hose receiving member 184 while the mist producing unit 16 on the hose receiving member 184 is exposed through the connector opening 186 at the center of the connector unit 18.

Preferably, as shown in FIG. 5B, the connector unit 8 further comprise a lock member 188 provided at the two end portions arranged for locking the two end portions into position in a detachable manner. For example, the lock member 188 can be a clip-lock.

Figure 3:
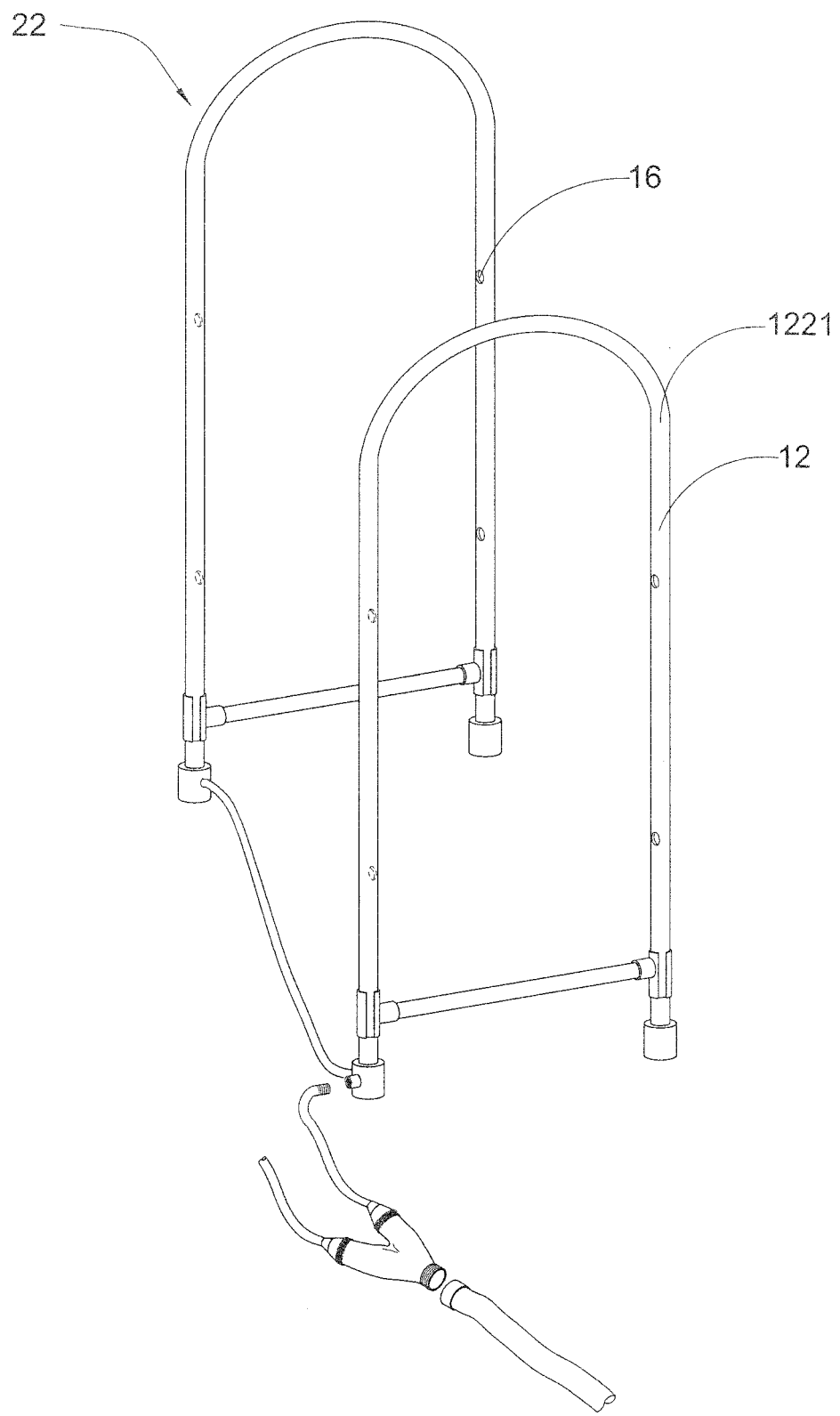
FIG. 3 is an illustration of a structural frame formed by the mist frame unit according to the above preferred embodiment of the present invention.

Referring to FIG. 3 of the drawings, the rigid frame member 1221 of the mist frame unit 12 is constructed into a structural frame which is capable of providing adequate support to one or more play units or the play set. In other words, the structural frame which is formed by the rigid frame member 1221 of the mist frame unit 12 can also be constructed to form the framework 22 of the play set 20.

Figure 6:
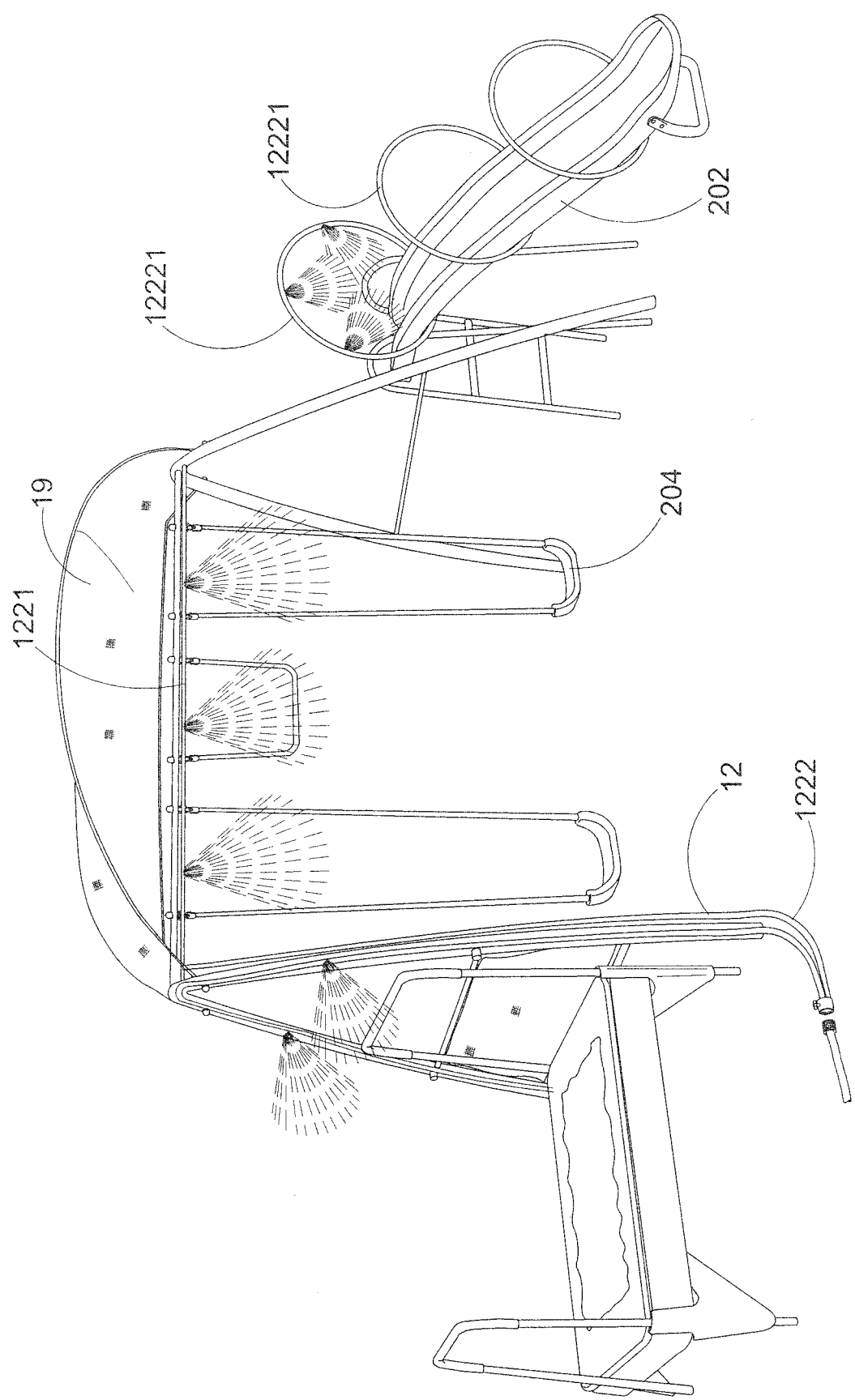
FIG. 6 is an illustration of a play set with mist producing device and sunshade unit which shows the hose ring construction of the mist frame unit according to a preferred embodiment of the present invention.

Referring to FIG. 6 of the drawings, the flexible hose member 1222 is constructed into a hose ring 12221 arranged for encircling the play unit 200 in such a manner that the play unit 200 is surrounded by the hose ring 200. Accordingly, the mist producing units 16 on the hose ring 12221 of the flexible hose member 1222 are surrounding the play unit 200 for providing mist to the play unit 200 covering at least 270° of the area of the play unit 200.

It is worth mentioning that the slide unit 202, in general, does not have any supporting structure provided on top and it is not possible to provide any additional shade structure or mist producing device 10 through the supporting structure which is provided below the slide unit 202. Therefore, the flexible hose member 1222 which is of sufficient flexibility to form the hose ring 12221, supported through the bottom supporting structure of the slide unit 202, is capable of providing mist to the slide unit 202 at all direction. In other words, a user will be able to receive the mist from all directions while sliding down from the slide unit 202.

Referring to FIG. 1 of the drawings, a sunshade unit 19 is further provided and mounted onto the play set 20 for shading the play set 20. The sunshade unit 19 can be mounted onto the play set 20 through the framework 22 of the play set 20. Alternately, the sunshade unit 19 may also be supported through the rigid frame member 1221.

Accordingly, the play set 20 is shaded from direct sunlight while covering by the mist from the mist producing device 10. In other words, a cool and shaded outdoor environment is provided for the play set 20.

Preferably, the mist producing unit 16 further comprises a mist control 161 on the mist producing unit 16 arranged for adjusting a mist pattern produced by the mist producing unit 16.

Accordingly, the present invention provides a play set 20 with a mist producing device 10 and/or a sunshade unit 19 in a cool and/or shaded outdoor environment. For example, as shown in FIG. 6 of the drawings, the play set 20 includes one slide unit 202, two swing units 204, one swing bar unit 206 and one trampoline unit 208 which are all covered by the mist producing device 10. In other words, kids or users can play in the outdoor environment which is cool and shaded. Therefore, during summer time when the temperature is very high and the sunlight is very strong, it is still safe to play within the area in the play set.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A mist device for a play set which comprises a framework on a playground area, comprising:
a mist frame unit for detachably coupling at and extended along an exterior of said framework of said play set, wherein said mist frame unit has a hollow and elongated body to define a water channel;
a water inlet provided at a first end of said mist frame unit for connecting to a water source so as to enable water to flow from said water source through said water channel of said mist frame unit;
a plurality of mist producing units spacedly provided along said mist frame unit, wherein each of said producing units defines a mist surrounding area for producing mist over said playground area so as to provide a cooling effect for said play set in said playground; and
a plurality of connector units for detachably connecting said hollow and elongated body on said exterior of said framework of said play set, wherein each of said connector units comprises a hose receiving member receiving said hollow and elongated body and a framework biasing member extended from said hose receiving member for detachably coupling at said framework so as to anchor and secure said hollow and elongated body onto said framework.

2. The mist device, as recited in claim 1, wherein said hose receiving member is formed at a center of said connector unit and said framework biasing member has two end portions extended outwardly for detachably clipping at said framework.

3. The mist device, as recited in claim 2, wherein said mist producing units are coupled at said connector units to communicatively link to said hollow and elongated body.

4. The mist device, as recited in claim 3, wherein each said connector unit further comprises a lock member provided at said two end portions arranged for locking said two end portions at said framework.

5. The mist device, as recited in claim 4, wherein said hollow and elongated body is a rigid frame for coupling on said exterior of said framework.

6. The mist device, as recited in claim 5, wherein said hollow and elongated body further forms a hose ring for encircling said play unit such that said mist producing units on said hose ring are arranged for providing mist to said play unit at an angle which is greater than 270°.

7. The mist device, as recited in claim 4, wherein said hollow and elongated body is a flexible hose member for coupling on said exterior of said framework.

8. The mist device, as recited in claim 7, wherein said hollow and elongated body further forms a hose ring for encircling said play unit such that said mist producing units on said hose ring are arranged for providing mist to said play unit at an angle which is greater than 270°.

9. The mist device, as recited in claim 2, wherein each said connector unit further comprises a lock member provided at said two end portions arranged for locking said two end portions at said framework.

10. The mist device, as recited in claim 2, wherein said hollow and elongated body is a rigid frame for coupling on said exterior of said framework.

11. The mist device, as recited in claim 2, wherein said hollow and elongated body is a flexible hose member for coupling on said exterior of said framework.

12. The mist device, as recited in claim 2, further comprising a sunshade unit mounted onto the play set for shading the play set.

13. The mist device, as recited in claim 2, wherein each said mist producing unit further comprises a mist control on said mist producing unit for adjusting a mist pattern produced by said mist producing unit.

14. The mist device, as recited in claim 1, wherein said mist producing units are coupled at said connector units to communicatively link to said hollow and elongated body.

15. A mist device for a play set which comprises a framework on a playground area, comprising:
a mist frame unit for detachably coupling at and extended along an exterior of said framework of said play set, wherein said mist frame unit has a hollow and elongated body to define a water channel;
a water inlet provided at a first end of said mist frame unit for connecting to a water source so as to enable water to flow from said water source through said water channel of said mist frame unit; and
a plurality of mist producing units spacedly provided along said mist frame unit, wherein each of said producing units defines a mist surrounding area for producing mist over said playground area so as to provide a cooling effect for said play set in said playground, wherein said hollow and elongated body further forms a hose ring for encircling said play unit such that said mist producing units on said hose ring are arranged for providing mist to said play unit at an angle which is greater than 270°.

16. A mist device for a play set, which comprises:
a framework on a playground area, comprising:

a mist frame unit for detachably coupling at and extended along an exterior of said framework of said play set, wherein said mist frame unit has a hollow and elongated body to define a water channel;

a water inlet provided at a first end of said mist frame unit for connecting to a water source so as to enable water to flow from said water source through said water channel of said mist frame unit; and a plurality of mist producing units spacedly provided along said mist frame unit, wherein each of said producing units defines a mist surrounding area for producing mist over said playground area so as to provide a cooling effect for said play set in said playground; and a sunshade unit mounted onto the play set for shading the play set.

17. A mist device for a play set which comprises a framework on a playground area, comprising:

a mist frame unit for detachably coupling at and extended along an exterior of said framework of said play set, wherein said mist frame unit has a hollow and elongated body to define a water channel;

a water inlet provided at a first end of said mist frame unit for connecting to a water source so as to enable water to flow from said water source through said water channel of said mist frame unit; and a plurality of mist producing units spacedly provided along said mist frame unit, wherein each of said producing units defines a mist surrounding area for producing mist over said playground area so as to provide a cooling effect for said play set in said playground, wherein each said mist producing unit further comprises a mist control on said mist producing unit for adjusting a mist pattern produced by said mist producing unit.

* * * * *